United States Patent [19]

Jones et al.

[11] Patent Number: 4,776,785
[45] Date of Patent: Oct. 11, 1988

[54] POSITIVE PRESSURE DOUGH DIVIDERS

[75] Inventors: Donald A. Jones, Mornington; Gerhard F. Wawra, Vermont South; William R. Moss, Wantirna, all of Australia

[73] Assignee: Baker Perkins Pty. Ltd, Springvale, Australia

[21] Appl. No.: 62,627

[22] Filed: Jun. 16, 1987

[30] Foreign Application Priority Data

Jun. 26, 1986 [AU] Australia .................. PH6580

[51] Int. Cl.$^4$ .................................................. A21C 5/04
[52] U.S. Cl. .................................... 425/239; 425/308; 425/376.1
[58] Field of Search ............... 425/239, 308, 376 R, 425/238

[56] References Cited

U.S. PATENT DOCUMENTS

| | | | |
|---|---|---|---|
| 1,900,607 | 3/1933 | Kremmling | 425/308 |
| 2,012,682 | 8/1935 | Johnson | 425/239 |
| 2,712,798 | 7/1955 | Naylor | 425/376 R |
| 2,922,189 | 1/1960 | Perks | 425/79 |
| 3,280,764 | 10/1966 | Potter et al. | 425/308 |
| 3,773,448 | 11/1973 | Poot | 425/239 |
| 3,901,635 | 8/1975 | Greenberger | 222/103 |
| 3,970,418 | 7/1976 | Turek | 425/140 |
| 4,190,410 | 2/1980 | Rhodes | 425/239 |
| 4,262,024 | 4/1981 | Mathason | 426/231 |
| 4,338,341 | 6/1982 | Glass | 425/239 |
| 4,445,835 | 5/1984 | Wasserbach | 425/308 |
| 4,494,920 | 1/1985 | Anderson | 425/239 |
| 4,503,995 | 3/1985 | Anderson | 425/240 |
| 4,573,898 | 3/1986 | Jones et al. | 425/239 |

FOREIGN PATENT DOCUMENTS 2076333  12/1981  United Kingdom ............... 426/503

Primary Examiner—Willard Hoag
Attorney, Agent, or Firm—Kerkam, Stowell, Kondracki & Clarke

[57] ABSTRACT

A positive pressure dough divider comprising a hopper for dough, and a pair of rotatable sheeting rolls which carry the dough from said hopper into a transfer passage leading to a volumetric measuring chamber inside a rotating body which is adapted to stop or rotate for periods at reduced speed, such that, while the measuring chamber is being charged with dough from the said rolls, a maximum possible charging time is provided, and to move at greater speeds at other times to provide minimum possible delay between charging operations. The rolls are of sufficiently large diameter, and rotate in opposite directions at such a speed, as to produce or maintain a dough of good gas retaining properties while providing a positive pressure rise along the direction of flow in the passage between the rolls sufficient to charge the measuring chamber or chambers. Cooling fluid is circulated within the interior of the rolls and adjacent the transfer passage to cool the dough moving between the rolls and through the transfer passage.

6 Claims, 2 Drawing Sheets

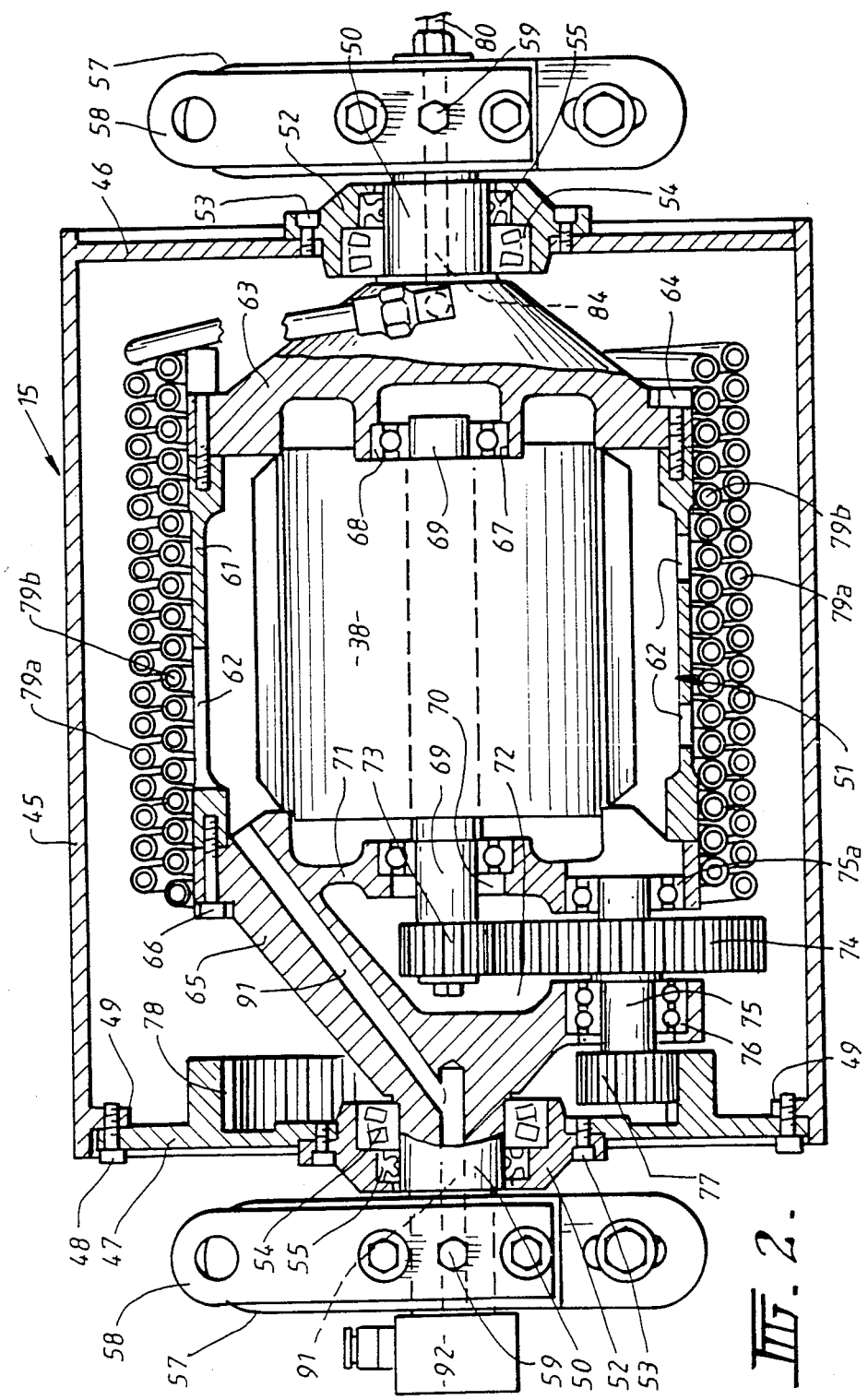

POSITIVE PRESSURE DOUGH DIVIDERS

TECHNICAL FIELD

This invention relates to improvements in positive pressure dough dividers, and in particular improvements in the dough divider the subject of our copending Australian Patent Application No. 19482/83 which originated with International Patent Application No. PCT/AU83/00133, and improvements in the process performed thereby.

BACKGROUND ART

In the aforementioned application there is disclosed a positive pressure dough divider comprising a hopper for dough, and a pair of rotatable sheeting rolls which carry the dough from the hopper into a transfer passage leading to a volumetric measuring chamber inside a rotating body which is adapted to stop, or rotate for periods of reduced speed, such that, whilst the measuring chamber is being charged with dough from the rolls, a maximum possible charging time is provided, and to move at greater speeds at other times to provide minimum possible delay between charging generations. The rolls are of a sufficiently large diameter, and rotate in opposite directions at such a speed, as to produce or maintain a dough of good gas retaining properties whilst providing a positive pressure rise along the direction of flow in the passage between the rolls sufficient to charge the measuring chamber or chambers. In addition, in order to prevent or minimise leakage at the sides of the rolls in the direction of the roll axes, barriers are provided which slope outwardly away from the direction of the dough flow between the rolls and which follow the circumferential surface of the rolls and are machined to have a safe working clearance from the rolls.

Such a dough divider has proved to be particularly successful with regard to accuracy when compared with conventional types of knife and ram reciprocating dividers by preventing the ingress of air and other undesirable materials, whilst minimising damage to the dough and inferior bread quality.

However, when operating with some types of dough, slices of the resulting bread have exhibited a visible deterioration in texture, such as, in some cases a visible swirl in the texture of slices which deterioration is regarded by the bread industry as disadvantageous.

It has been determined by testing and analysis of the divider operation that the above problem is associated with temperature rise in a proportion of the dough passing through the divider and resulting from the mechanical work performed in effecting the required pressure rise through the sheeting rolls. The major portion of the work performed on the dough occurs in the passage defined from the top of the rolls, down between the rolls and through the transfer passage.

DISCLOSURE OF THE INVENTION

It has been determined that if at least some of the parts of the divider, adjacent the path of the dough in the area in which work is being performed and pressure rise occurs, are cooled to a temperature below that of the dough such that they impart a cooling effect on the dough to prevent excessive temperature rise, the deleterious effects in the resulting bread are either totally or substantially eliminated.

Some beneficial effect is achieved by cooling the rolls. However, because of the sheeting action within the dough, temperature rise also continues within the transfer passage, and an additional beneficial effect can also achieved by cooling the transfer passage, and thus cooling of one or both sheeting roll surfaces and/or part of the surface of the transfer passage will assist in minimizing or eliminating the problem.

In accordance with the invention there is provided, in a process of dough division involving pressurizing the dough, an improvement comprising cooling the dough by circulating a cooling fluid, adjacent a wall of at least a portion of the divider in contact with the dough, to cool the dough.

In accordance with the present invention there is also provided an improved positive pressure dough divider, comprising a dough supply and a pair of rotatable sheeting rolls for creating positive pressure in the dough whilst conveying the dough from said supply into a transfer passage leading to one or more volumetric measuring chambers, said rolls being of sufficiently large diameter, and rotatable in opposite directions at such a speed, as to produce or maintain a dough of good gas retaining properties while providing a positive pressure rise along the direction of flow and sufficient to charge the measuring chamber or chambers with dough under pressure, and wherein cooling means are provided, adjacent a wall of at least a portion of the divider in contact with the dough, through which to circulate cooling fluid to cool the dough.

BRIEF DESCRIPTION OF THE DRAWINGS

Our preferred embodiment of the invention will now be described with reference to the accompanying drawings, in which;

FIG. 2 is a cross-sectional view taken along line 2—2 of FIG. 1.

BEST MODE FOR CARRYING OUT THE INVENTION

Figure 1:
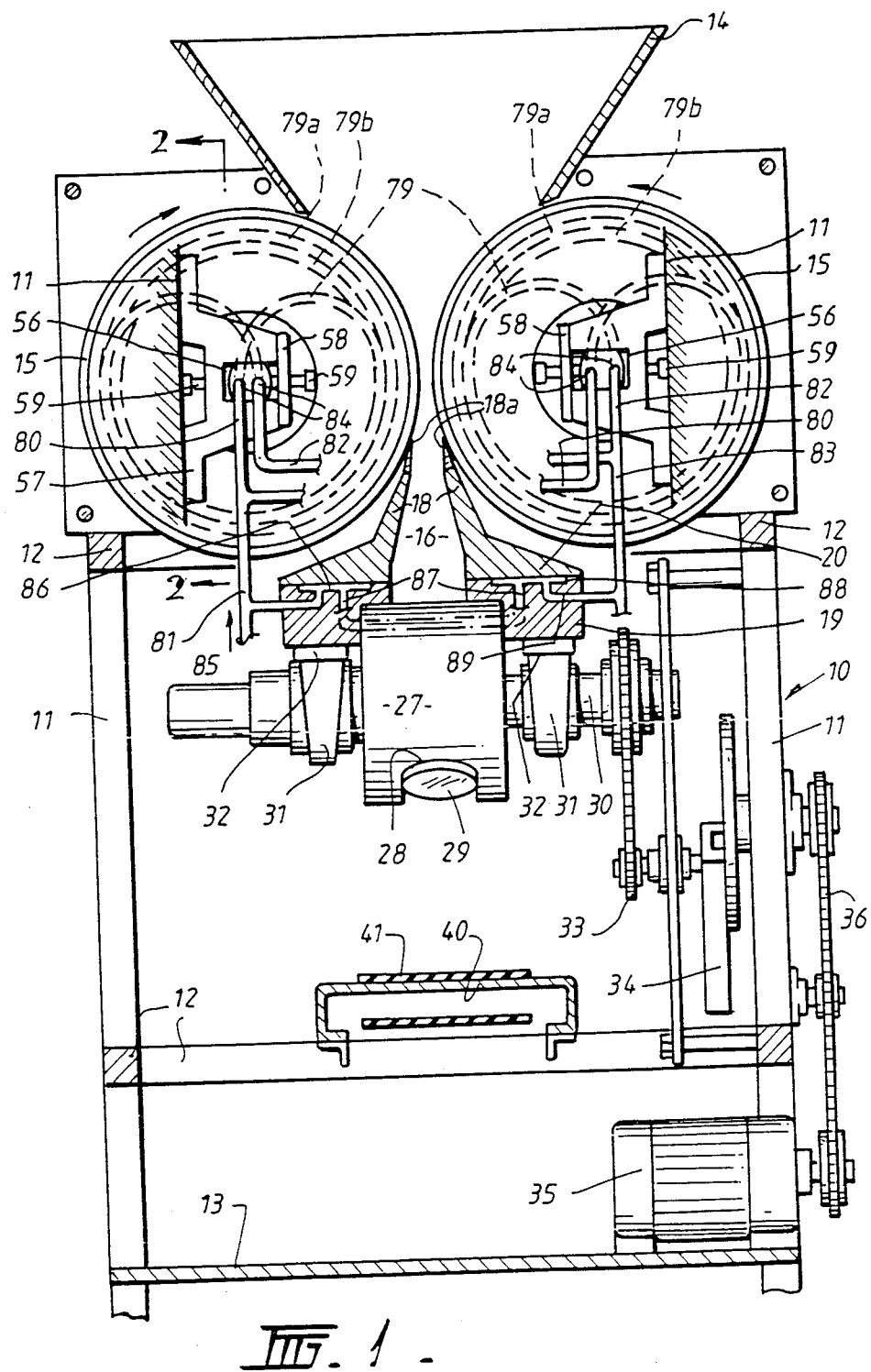
FIG. 1 is an end elevational view, partly sectioned, of the positive pressure dough divider incorporating the present invention.

With reference to the drawings, the preferred form of dough divider of the present invention consists of a main support frame 10 comprising upright frame members 11 and horizontal frame members 12, together with a lower platform 13. A dough hopper 14 is mounted at the top of the frame and above a pair of large plain feed rolls 15 in the form of sheeting rolls which, whilst rotating in the direction shown in FIG. 1, draw dough from the hopper down between themselves and into a short transfer passage 16 defined by a pair of side walls 18 the top edges of which, via replaceable scrapers 18a, bear against the circumferential surface of the rolls 15 and are attached to a mounting plate 19 via connecting flanges 20.

As described in the specification of the aforementioned Australian Patent Application, as the dough passes from the hopper 14 between the feed rolls 15 and increases in pressure, it is caused to flow sideways in the direction of the roll axes and would, if not prevented, leak out the side of the rolls. As described and illustrated in the aforementioned application, the transfer passage is therefor further defined by opposed barrier plates situated at both ends of the rolls, and extended to slope outwardly away from the axis of the dough flow as the dough proceeds through the rolls. These barrier plates and extensions follow the circumferential surface of the rolls and are machined to have a safe running clearance from the rolls. The slope of the extensions ensures that there is a component of the velocity of the surface of the rolls normal to the interior surface of the extensions. In operation, dough under pressure is forced into the gap 16 between the barrier plates and extensions and the surface of the rolls 15 and the resulting normal component of velocity of the surface acts on this viscous dough forced into the gap and prevents further penetration into the gap and leakage past the barrier plates.

It has been found from tests when running the divider that, with an outward slope of 5-10° for the extensions of the barrier plates, dough leakage can be prevented except that in the corner formed by the sloping sides and the transverse scrapers 18a bearing against the drum where a small amount of dough leakage may occur. This leakage is caused by penetration of the order of 4 mm of dough running between the barrier plates and the drum and as this small amount of dough is not intercepted by the transverse scraper and is carried away by attachment to the drum surface and such as to constitute leakage. By increasing the slope of the barrier plate extensions to an angle of 45° or more (up to 90°) at the point of junction with the transverse scraper 18a, this small leakage is effectively eliminated.

The above manner of sealing the dough from end leakage as dough passes through the passage between the rolls and in the pressure chamber immediately after the rolls and before the measuring cylinder, is described and illustrated in detail in the aforementioned Australian Patent Application and is preferred as, from the point of view of neatness of design and hygiene, it is considered undesirable to have either extensive close fitting metal seals with associated high drag or the wear rates of spring loaded type seals.

The measuring or divider section of the machine is suspended within the frame by means of the mounting plate 19. The mounting plate 19 carries a pair of opposed arcuate scraper walls, as described and illustrated in detail in the aforementioned Australian Patent Application, and which bear against the circumferential surface of a rotating cylinder 27 which incorporates a cylindrical measuring chamber 28 extending transversely through the cylinder 27 and within which a free floating piston member 29 is received. The cylinder 27 is in turn supported for rotation on a shaft 30 supported in bearings 31 spaced on either side thereof and suspended, via connecting members 32, from the underside of the mounting plate 19. The shaft 30 is driven by a chain drive 33, which in turn is driven by a mechanical harmonic variator mechanism 34 from an electric motor 35 via a further chain drive 36. As shown the electric motor 35 is mounted on the platform 13 of the main frame. The variator 34 is adapted to allow for a period of reduced rotational speed of the cylinder 27 whilst the measuring chamber 28 is being charged with dough and to allow faster rotation at other times to provide a minimum possible delay between charging of the measuring chamber 28. As example a ratio between high and low speeds of 4:1 may be utilized. As an alternative to the mechanism 34 a Hooke's Joint Coupling may be incorporated into the drive mechanism so as to utilize the cyclical speed variation which may be induced by such couplings.

With particular reference to FIG. 2 of the drawings, the feed rolls 15 are each rotatably driven by electric motors 38 mounted wtihin the rolls themselves and supplied by variable frequency thyristor controlled inverters as supplied by Danfoss of Denmark under the name VLT. The inverters are arranged to automatically maintain the motor current and therefor the torque, constant at a pre-set level.

Each roll 15 comprises a cylindrical drum 45, one end of which is closed by a first end plate 46 welded at its circumference within the end of the drum, whilst the other end of the drum is closed by a second end plate 47, attached by bolts 48 adjacent its circumference to a flange 49 extending circumferentially around the interior of the drum adjacent the end thereof. The roll 15 is mounted to rotate about stub axles 50 at either end of a motor and gear box housing 51 situation within the roll. The stub axles 50 are received through housings 52 connected by bolts 53 to the respective end plates 46 and 47 at the axis of rotation of the roll, and as shown each housing contains a bearing assembly 54 and a fluid seal 55. The stub axles extend externally of the respective housings 52 and are mounted in slots 56 formed in mounting brackets 57 and are retained in place by keeper plates 58 extending across the ends of the slots and bolted to the brackets on either side of the slots. The position of the stub axles, and therefore the position of the axis of rotation of the rolls, is adjustable by means of bolts and lock nut arrangements 59 extending through the brackets 57 and keeper plates 58 at each end of the slot 56. The brackets 57 are, in turn, bolted to vertical uprights 11 forming part of the main support frame 10.

The motor and gear box housing 51 comprises a central cylindrical cage 61 having apertures 62 therethrough, and a first end wall casting 63 bolted at 64 to one end of the cage and carrying the stub axle 50 at that end. A second end wall casting 65 is bolted at 66 to the other end of the cage and carries the stub axle 50 at that end. A bearing recess 67 is formed on the inside of the first end wall casting 63 to receive a bearing 68 for the shaft 69 of the electric motor 38, whilst the shaft 69 at the other end of the motor extends through an aperture 70 in a partition 71 forming part of the second end wall casting 65 and defining, with the remainder of the casting, a chamber 72 for part of the gear train. The gear train through which drive from the electric motor shaft 69 to the roll is transmitted, comprises a gear pinion 73 driving a gear wheel 74 mounted on a shaft 75 which, in turn, is supported at one end via a bearing 75a in the lower part of the second end wall casting 65. The shaft 75 is also supported part-way along its length in a bearing assembly 76 also mounted within the lower part of the casting 65. The shaft 75 carries at its other free end a gear pinion 77 which engages and drives an internal ring gear 78 attached to the second end plate 47 of the roll. It will be apparent that drive from the electric motor through the gear train to the internal ring gear causes the roll to rotate about the stub axles 50.

In an alternative drive system, each roll 15 may be driven by a fixed volume hydraulic motor fed from a constant pressure oil supply incorporating a pressure compensated hydraulic pump. The displacement of the hydraulic pump is automatically varied in response to delivery pressure and to provide preset constant pressure. As the hydraulic motors are of fixed displacement they provide constant torque at the preset pressure which in turn provides maximum speed of the feed rolls during transfer of the dough into the measuring chamber 28, and reduced speed at other times. When driven by electric motors 38, controlled in the manner discussed above, a drive of similar characteristics to the hydraulic drive is achieved in view of the fact that motor torque is proportional to current.

The free floating piston 29 is supported within the measuring cylinder 28 by a shaft and elongate slot arrangement, as described in detail in the aforementioned Australian Patent Application, and such that the length of the slot determines the length of the stroke of the piston, whilst means may be provided to allow a limited amount of adjustment of its stroke to allow for variation in the weight of dough pieces to be measured or divided. Alternatively weight adjustment may be achieved by replacement of the piston with a piston of different length. As dough is charged into one end of the measuring chamber 28 the piston discharges as previously measured dough piece from the opposite end of the measuring chamber onto the end of an endless conveyor belt 41 the upper run of which is supported on a flat plate 40 and which conveys the measured dough pieces away from the divider.

With the divider of this preferred embodiment of the invention, the relatively large plain feed rolls 15 and scrapers 18a serve to carry dough to the measuring cylinder 28 with a minimum of tearing or excessive shearing of the dough compared with disc type rolls or other possible pumping means. Furthermore, the transfer passage 16 in being made as short as possible further minimizes working of the dough as it moves therethrough to the measuring cylinder. In addition, the maximum possible charging time provided by the variator mechanism in the drive for the cylinder 27 allows for the use of relatively slow speeds for the feed rolls 15 further minimizing working of the dough, whilst the short time delay between charging operations minimizes the time that the pressure compensated hydraulic pump is required to rotate the rolls under no flow conditions.

In this preferred embodiment of the divider of the present invention the feed rolls 15 are in the order of 500 mm in diameter and 240 mm long, and has an output of up to 12,000 measured 770 gm dough pieces per hour when run at a mean speed of 140 rpm, or a lesser number of heavier dough pieces or a greater number of smaller dough pieces. While presenting the capacities of associated baking plant limit operation above the above output, the divider has been successfully tested at substantially higher speeds to achieve outputs of up to 18,000 dough pieces per hour whilst still achieve the required dough quality.

The sheeting rolls 15 which are rotated in opposite directions, feed dough from the supply hopper 14 downwardly into the throat of the transfer passage 16 and thereafter into the measuring chamber arrangement to charge the measuring chamber arrangement to charge the measuring chamber with dough under pressure in the manner described.

In accordance with the preferred embodiment of the improvement of the present invention, the interiors of the rolls 15 contain a cooling tube 79 spiralling wound along the outside length of the motor and gear box housing 51, with a portion thereof in the form of a large diameter spiral coil 79a extending from a fluid inlet at one end to the other end of the housing 51 where it takes the form of a smaller diameter spiral coil 79b extending back along the housing to a fluid outlet. Cooling fluid, such as water, is fed from coolant feed pipes 80, which in turn are fed from a common coolant supply pipe 81, to circulate through the cooling tubes 79 in the rolls and then outwardly through outlet pipes 82 which in turn are coupled to a common exhaust pipe 83. The supply and outlet pipes 81 and 82 communicate with the respective inlets and outlets for the cooling tubes 79 via transfer ports 84 through and along the length of the stub axle 50 at one end of rolls and then through the first end wall casting 63 of the motor and gear box housing 51. Coolant fed to, and circulating within the cooling tube 79, should be at a temperature below that of the temperature level generated within the dough so as to receive heat from the dough through the circumferential wall of the rolls. Lubricant contained with the respective rolls to lubricate the gear transmission also acts as a medium to transfer heat from the circumferential wall of the rolls to their cooling tubes 79.

In addition, in this embodiment, or as an alternative in a different embodiment, coolant is also fed from the supply pipe 81 via a by-pass passage 85 to a chamber 86 formed between the mounting plate 19 and the adjacent flange 20 of the side wall 18 on one side of the transfer pasage 16, and then from chamber 86, via a transfer passage 87, to a similar chamber 88 formed between the mounting plate 19 and the adjacent flange 20 on the other side of the transfer passage, before feeding onto the exhaust pipe 83 through a return passage 89. The coolant circulating through the chambers 86 and 88 is also at a temperature less than that generated in the dough and to draw heat from the dough through the wall of the transfer passage to be carried away by the coolant.

Coolant, in the form of water, may be supplied from a mains pressure source and exhausted to waste, or alternatively may be included in a closed circuit incorporating a heat exchanger or refrigerating unit to extract heat from the coolant in the exhaust pipe 83 before feeding on again the supply pipe 81.

As shown in FIG. 2, the stub axle 50 at the end of each of the rolls 15, and opposite to the coolant supply and exhaust, has an axial passage 90 therethrough communicating with a passage 91 through the second end wall casting 65 and extending to a position adjacent the motor 38. A cable (not shown) supplying electric power to the motor extends through the passages 90 and 91 from a terminal box 92 mounted on the end of the stub axle 50.

The claims defining the invention are as follows

We claim:

1. An improved positive pressure dough divider, comprising a dough supply and a pair of rotatable sheeting rolls for creating positive pressure in the dough whilst conveying the dough from said supply into a transfer passage leading to one or more volumetric measuring chambers, said rolls being of sufficiently large diameter, and rotatable in opposite directions at such a speed, as to produce or maintain a dough of good gas retaining properties while providing a positive pressure rise along the direction of flow and sufficient to charge the measuring chamber with dough under pressure, and wherein cooling means are provided, adjacent a wall of at least a portion of the divider in contact with dough, through which to circulate cooling fluid to cool the dough.

2. An improved dough divider as claimed in claim 1, wherein said cooling means are provided adjacent the surface of at least one of said rolls.

3. An improved dough divider as claimed in claim 2, wherein said cooling means are passage means extending around the interior of the roll.

4. An improved dough divider as claimed in claim 3, wherein said passage mean is a coiled tube.

5. An improved dough divider as claimed in claim 1, wherein said cooling means are provided adjacent portion of wall members defining said transfer passage.

6. An improved dough divider as claimed in claim 5, wherein said cooling means also extends adjacent the surface of least one of said rolls.

* * * * *